United States Patent
Sugita

(10) Patent No.: US 10,708,503 B2
(45) Date of Patent: Jul. 7, 2020

(54) IMAGE CAPTURE SYSTEM, IMAGE CAPTURING APPARATUS, LENS UNIT, CONTROL METHODS THEREFOR, AND STORAGE MEDIUM

(71) Applicant: CANON KABUSHIKI KAISHA, Tokyo (JP)

(72) Inventor: Atsushi Sugita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/269,038

(22) Filed: Feb. 6, 2019

(65) Prior Publication Data
US 2019/0174064 A1    Jun. 6, 2019

Related U.S. Application Data

(63) Continuation of application No. 15/462,061, filed on Mar. 17, 2017, now Pat. No. 10,237,484.

(30) Foreign Application Priority Data

Mar. 23, 2016    (JP) .................................. 2016-059153

(51) Int. Cl.
*H04N 5/232*    (2006.01)
*G02B 7/14*    (2006.01)
(Continued)

(52) U.S. Cl.
CPC ........... *H04N 5/23287* (2013.01); *G02B 7/14* (2013.01); *G02B 27/646* (2013.01); *H04N 5/04* (2013.01);
(Continued)

(58) Field of Classification Search
CPC ........... H04N 5/23287; H04N 5/23296; H04N 5/2353; H04N 5/2254; H04N 5/23212;
(Continued)

(56) References Cited

U.S. PATENT DOCUMENTS

| | | | |
|---|---|---|---|
| 2001/0032323 A1 | 10/2001 | Takagi et al. | |
| 2009/0256950 A1* | 10/2009 | Kawazoe | G03B 13/36 348/345 |
| 2009/0285572 A1 | 11/2009 | Shibuno et al. | |

FOREIGN PATENT DOCUMENTS

| | | |
|---|---|---|
| CN | 101150670 A | 3/2008 |
| JP | 2006-317848 A | 11/2006 |

(Continued)

OTHER PUBLICATIONS

The above foreign patent document was cited in a Oct. 9, 2019 Chinese Office Action, a copy of which is enclosed with an English Translation, that issued in Chinese Patent Application No. 201710179665.7.

(Continued)

*Primary Examiner* — Yogesh K Aggarwal
(74) *Attorney, Agent, or Firm* — Cowan, Liebowitz & Latman, P.C.

(57) ABSTRACT

An image capturing apparatus is configured to have an interchangeable lens detachably mounted thereto, and is provided with an image capturing unit configured to obtain a captured image, a synchronous signal generation unit configured to generate a synchronous signal for reading out the captured image continuously from the image capturing unit, a communication unit configured to transmit the synchronous signal to the interchangeable lens, and a measurement unit configured to measure a delay time from a timing at which the synchronous signal is generated until a timing at which the communication unit transmits the synchronous signal to the interchangeable lens, the delay time being transmitted to the interchangeable lens by the communication unit together with the synchronous signal.

40 Claims, 9 Drawing Sheets

(51) Int. Cl.
*G02B 27/64* (2006.01)
*H04N 5/04* (2006.01)
*H04N 5/225* (2006.01)
*H04N 5/235* (2006.01)

(52) U.S. Cl.
CPC ......... *H04N 5/2254* (2013.01); *H04N 5/2353* (2013.01); *H04N 5/23209* (2013.01); *H04N 5/23212* (2013.01); *H04N 5/23254* (2013.01); *H04N 5/23261* (2013.01); *H04N 5/23296* (2013.01)

(58) Field of Classification Search
CPC .. H04N 5/23254; H04N 5/04; H04N 5/23209; H04N 5/23261; G02B 27/646; G02B 7/14
USPC ................ 348/335, 340, 345, 348, 350, 352
See application file for complete search history.

(56) References Cited

FOREIGN PATENT DOCUMENTS

| | | |
|---|---|---|
| JP | 2010-015131 A | 1/2010 |
| JP | 2015-161730 A | 9/2015 |

OTHER PUBLICATIONS

The above foreign patent document was cited in the Sep. 17, 2019 Japanese Office Action, a copy of which is inclosed without an English Translation, that issued in Japanese Patent Application No. 2016059153.

* cited by examiner

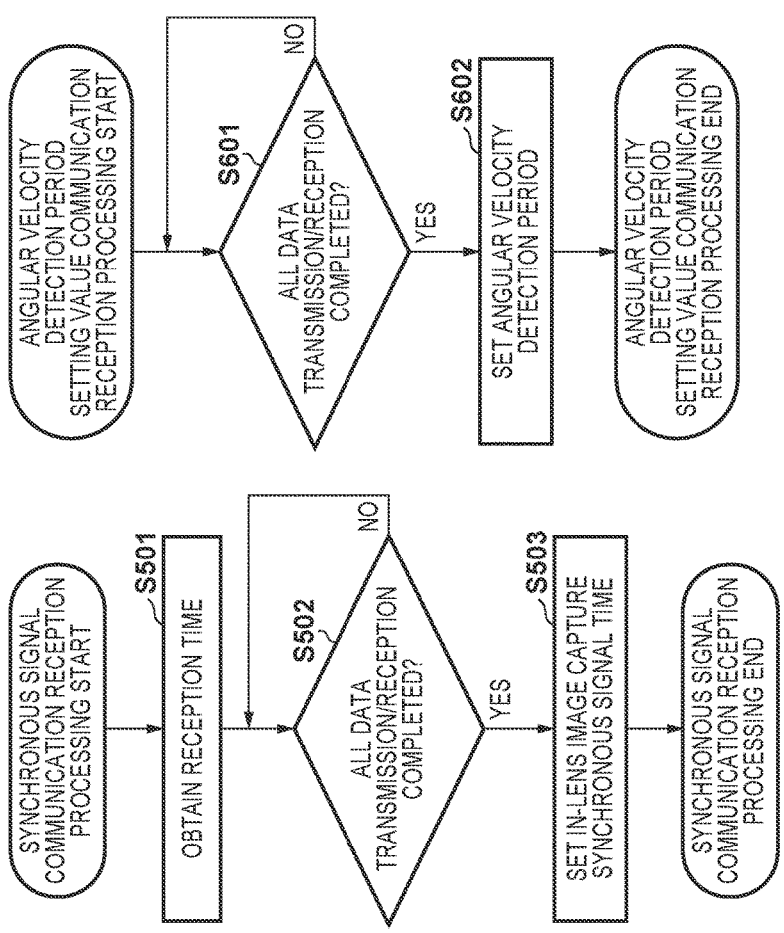
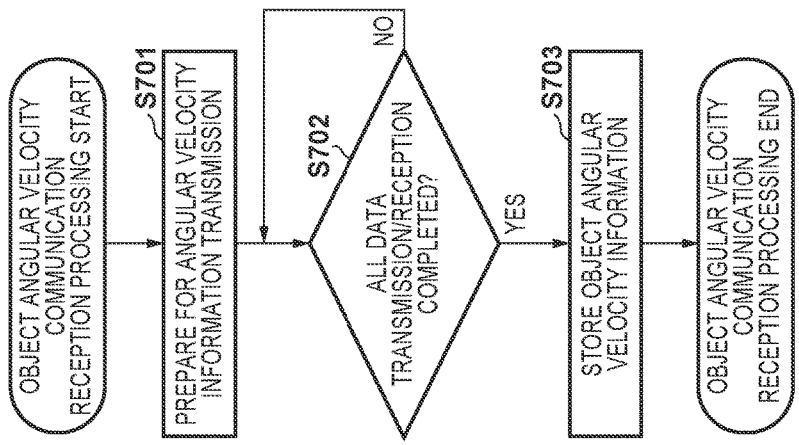

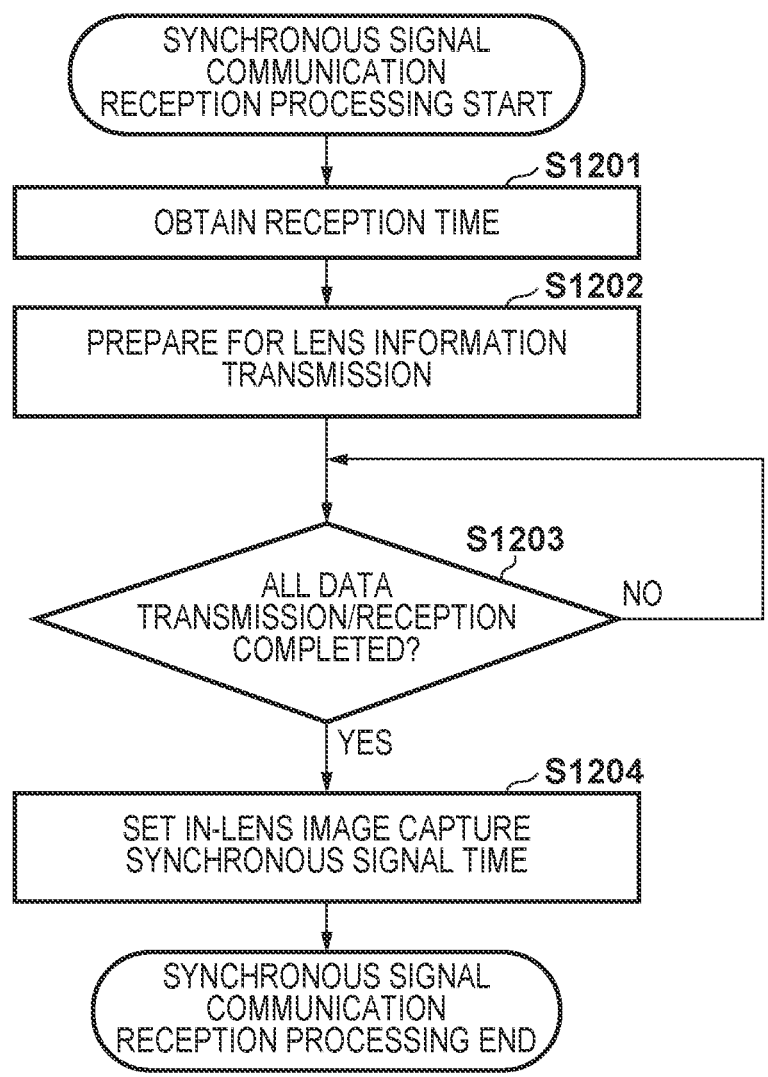

IMAGE CAPTURE SYSTEM, IMAGE CAPTURING APPARATUS, LENS UNIT, CONTROL METHODS THEREFOR, AND STORAGE MEDIUM

CROSS-REFERENCE TO RELATED APPLICATIONS

This application is a continuation of application Ser. No. 15/462,061, filed Mar. 17, 2017 the entire disclosure of which is hereby incorporated by reference.

BACKGROUND OF THE INVENTION

Field of the Invention

The present invention particularly relates to data communication and control of a camera and an interchangeable lens when taking a panning shot, in a camera system that includes the camera and the interchangeable lens.

Description of the Related Art

A technique called a panning shot is known as a photography technique that conveys the feeling of the speed of a moving object. A panning shot aims to make the moving object appear stationary with a flowing background, as a result of the user panning the camera in time with the movement of the object. Here, with a panning shot, the user needs to pan (swing the camera) in time with the movement of the object. At this time, when the panning speed is too fast or too slow, a difference occurs between the moving speed of the object and the panning speed, possibly resulting in an image in which the object that the user is trying to stop is blurred. A technology (panning assist) that assists the taking of a panning shot has been proposed in response to such problems. This panning assist suppresses blurring of the object by moving a shift lens for image stabilization based on the panning speed of the camera and the motion vector of the object detected from an image to absorb the difference between the moving speed of the object and the panning speed.

For example, Japanese Patent Laid-Open No. 2006-317848 proposes a method that provides for a successful panning shot, by detecting the difference between the moving speed of the object and the speed at which the camera is swung and correcting a shift amount equivalent to the difference in speed using an image stabilization function.

Also, Japanese Patent Laid-Open No. 2015-161730 proposes a method that matches the output timing of a blur detection part with the motion vector of the object image, by changing the output timing of the blur detection part according to the exposure time or the frame rate, to enhance the detection accuracy of the moving speed of the object.

However, the conventional technologies disclosed in the abovementioned patent documents are only implementable in an integrated camera in which a motion vector detection part, an image stabilization control part and a panning assist control part are constituted within the same main body, and consideration is not given to implementation in an interchangeable lens type camera system.

SUMMARY OF THE INVENTION

The present invention has been made in view of the abovementioned problems, and realizes highly accurate panning assist in an interchangeable lens type camera system.

According to a first aspect of the present invention, there is provided an image capture system comprising an image capturing apparatus and an interchangeable lens configured to be detachably mounted to the image capturing apparatus, the image capturing apparatus including: an image capturing unit configured to obtain a captured image; a synchronous signal generation unit configured to generate a synchronous signal for reading out the captured image continuously from the image capturing unit; a first communication unit configured to transmit the synchronous signal to the interchangeable lens; and a first measurement unit configured to measure a delay time from a timing at which the synchronous signal is generated until a timing at which the first communication unit transmits the synchronous signal to the interchangeable lens, the delay time being transmitted to the interchangeable lens by the first communication unit together with the synchronous signal, and the interchangeable lens including: an obtaining unit configured to obtain lens information; a second communication unit configured to transmit the lens information to the image capturing apparatus; a receiving unit configured to receive the synchronous signal and the delay time from the image capturing apparatus; a second measurement unit configured to measure a time at which the receiving unit receives the synchronous signal; a calculation unit configured to calculate a synchronous signal time which is a predicted value of the timing at which the synchronous signal is generated in the image capturing apparatus, by subtracting the delay time from the time, measured by the second measurement unit, at which the synchronous signal is received; and a determination unit configured to determine a timing for the obtaining unit to obtain the lens information, based on the synchronous signal time.

According to a second aspect of the present invention, there is provided an image capturing apparatus configured to have an interchangeable lens detachably mounted thereto, comprising: an image capturing unit configured to obtain a captured image; a synchronous signal generation unit configured to generate a synchronous signal for reading out the captured image continuously from the image capturing unit; a communication unit configured to transmit the synchronous signal to the interchangeable lens; and a measurement unit configured to measure a delay time from a timing at which the synchronous signal is generated until a timing at which the communication unit transmits the synchronous signal to the interchangeable lens, the delay time being transmitted to the interchangeable lens by the communication unit together with the synchronous signal.

According to a third aspect of the present invention, there is provided an interchangeable lens configured to be detachably mounted to an image capturing apparatus, comprising: an obtaining unit configured to obtain lens information; a communication unit configured to transmit the lens information to the image capturing apparatus; a receiving unit configured to receive, from the image capturing apparatus, a synchronous signal and a delay time from generation until communication of the synchronous signal; a measurement unit configured to measure a time at which the receiving unit receives the synchronous signal; a calculation unit configured to calculate a synchronous signal time which is a predicted value of a timing at which the synchronous signal is generated in the image capturing apparatus, by subtracting the delay time from the time, measured by the measurement unit, at which the synchronous signal is received; and a determination unit configured to determine a timing for the obtaining unit to obtain the lens information, based on the synchronous signal time.

According to a fourth aspect of the present invention, there is provided a method for controlling an image capturing apparatus configured to have an interchangeable lens detachably mounted thereto and including an image capturing unit configured to obtain a captured image, the method comprising: generating a synchronous signal for reading out the captured image continuously from the image capturing unit; transmitting the synchronous signal to the interchangeable lens; and measuring a delay time from a timing at which the synchronous signal is generated until a timing at which the synchronous signal is transmitted to the interchangeable lens in the transmitting, the delay time being transmitted to the interchangeable lens by the transmitting together with the synchronous signal.

According to a fifth aspect of the present invention, there is provided a method for controlling an interchangeable lens configured to be detachably mounted to an image capturing apparatus, the method comprising: obtaining lens information; transmitting the lens information to the image capturing apparatus; receiving, from the image capturing apparatus, a synchronous signal and a delay time from generation until communication of the synchronous signal; measuring a time at which the synchronous signal is received in the receiving; calculating a synchronous signal time which is a predicted value of a timing at which the synchronous signal is generated in the image capturing apparatus, by subtracting the delay time from the time, measured in the measuring, at which the synchronous signal is received; and determining a timing for obtaining the lens information in the obtaining, based on the synchronous signal time.

Further features of the present invention will become apparent from the following description of exemplary embodiments with reference to the attached drawings.

BRIEF DESCRIPTION OF THE DRAWINGS

FIG. 5 is a flowchart showing reception processing of synchronous signal communication in the first embodiment.

FIG. 6 is a flowchart showing reception processing of angular velocity detection period setting communication in the first embodiment.

FIG. 7 is a flowchart showing reception processing of object angular velocity communication in the first embodiment.

FIG. 12 is a flowchart showing reception processing of synchronous signal communication in the second embodiment.

DESCRIPTION OF THE EMBODIMENTS

Hereinafter, embodiments of the present invention will be described in detail, with reference to the accompanying drawings.

First Embodiment

Figure 1:
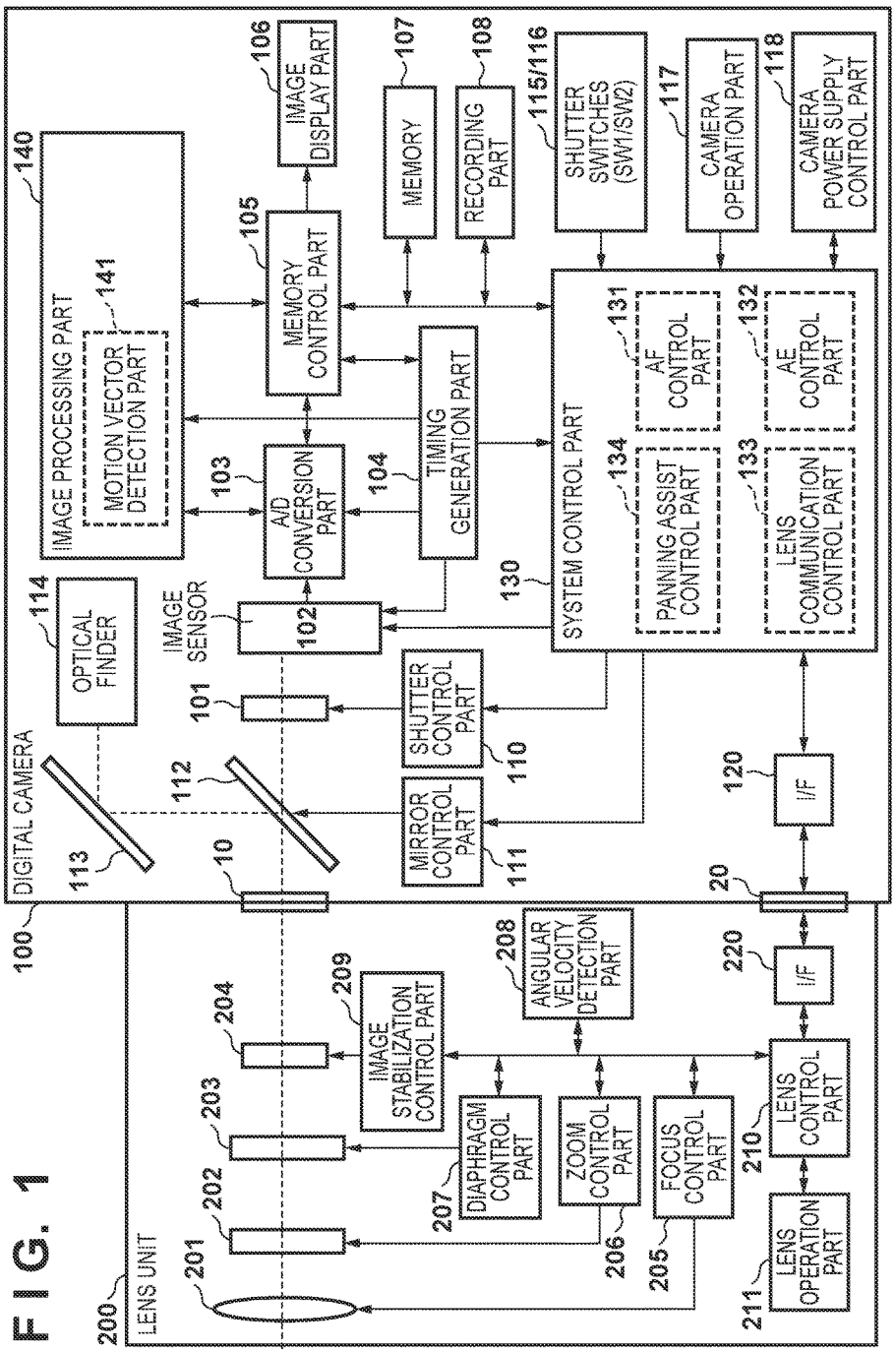
FIG. 1 is a block diagram showing the configuration of an image capturing apparatus according to a first embodiment of the present invention.

FIG. 1 is a block diagram showing the configuration of an interchangeable lens type camera system (image capture system) serving as a first embodiment of an image capturing apparatus of the present invention. The interchangeable lens type camera system has a camera main body and a detachable interchangeable lens that is communicable with the camera main body. The configuration of the interchangeable lens type camera system according to the present embodiment that has a panning assist function will be described, with reference to the block diagram of FIG. 1.

In FIG. 1, a lens unit 200 is detachably mounted to a digital camera 100 via a lens mount part 10. First, the configuration of the lens unit 200 will be described. The lens unit 200, which is mountable to the digital camera 100, includes an image capture optical system that is provided with a focusing lens 201, a zoom lens 202, a diaphragm 203 and a shift lens (image stabilization lens) 204. Note that each lens is shown with one lens in FIG. 1, but may be a lens group that is constituted by a plurality of lenses. Light beams incident via the image capture optical system are guided to an image sensor 102, and an image is formed on the image sensor 102 as an optical image.

Next, the configuration of the digital camera 100 will be described. A shutter 101 within the digital camera 100 controls light exposure to the image sensor 102. The image sensor 102, which is constituted by a CCD sensor or a CMOS sensor, converts the optical image of the object into an analog image signal. Note that the image sensor 102 may have a plurality of focus detection pixels.

An A/D conversion part 103 converts the analog image signal that is output from the image sensor 102 into a digital image signal, and outputs the digital image signal to an image processing part 140 and a memory control part 105. The optical image of the object is observable using an optical finder 114 via a mirror 112 and a mirror 113, in a state where the mirror 112 is in a down position that is shown in FIG. 1. A timing generation part 104 performs supply (synchronous signal generation) of a clock signal and a synchronous signal to the image sensor 102, the A/D conversion part 103, the image processing part 140, the memory control part 105, and a system control part 130.

The image processing part 140 performs predetermined processing such as pixel interpolation and color conversion on the digital image signal from the A/D conversion part 103 or data from the memory control part 105, and generates image data. Also, the image processing part 140 performs predetermined computational processing using the digital image signal. Note that the image processing part 140 is provided with a motion vector detection part 141, and detects the motion vector of a captured image based on the image data of a plurality of frames that are output successively. The computation result of the image processing part 140 is input to the system control part 130 via the memory control part 105.

The memory control part 105 controls the A/D conversion part 103, the timing generation part 104, the image processing part 140, a memory 107, a recording part 108, and an image display part 106. The output data from the A/D conversion part 103 is written to the memory 107 and the recording part 108, via the image processing part 140 and the memory control part 105.

The memory 107 and the recording part 108 store captured still images and moving images. The memory 107 is also used as a workspace of the system control part 130. The recording part 108 is used as an image recording area that is constituted by a nonvolatile memory attached internally or externally. The image display part 106 is constituted using an LCD (liquid crystal display) or the like and, in the case of an EVF (electronic view finder), sequentially displays captured image data using the image display part 106 or an external display device which is not illustrated, and realizes an EVF function. At the time of image reproduction, images recorded in the recording part 108 are displayed. A shutter control part 110 controls the shutter 101 in coordination with a mirror control part 111, based on control signals from the system control part 130. The mirror control part 111 controls the mirror 101, based on control signals from the system control part 130.

The system control part 130 controls various elements of the camera such as the image sensor 102, the memory control part 105, the shutter control part 110 and the mirror control part 111, in accordance with input from a shutter switch 115 (SW1), a shutter switch 116 (SW2), a camera operation part 117, the memory control part 105 or the like. Also, the lens unit 200 is controlled via an I/F 120. The entire camera system is controlled by these operations.

The shutter switch 115 (SW1) instructs the system control part 130 to start operations such as AF (autofocus) processing, AE (auto exposure) processing and AWB (auto white balance) processing. The shutter switch 116 (SW2) instructs the system control part 130 to start exposure. The system control part 130, having received the exposure start instruction, controls the mirror control part 111, the shutter control part 110, the memory control part 105, and the lens unit 200 via the I/F 120 to execute processing for recording image data to the recording part 108.

The camera operation part 117 is composed of various buttons, a touch panel, a power supply ON/OFF button and the like, and outputs instructions received as a result of user operations to the system control part 130. In accordance with user operations performed on the camera operation part 117, the system control part 130 implements various functions installed on the digital camera 100 and switching of operation modes such as an AF mode, an AE mode and a panning assist mode.

The camera power supply control part 118 manages an external battery or an internal battery. In the case where the battery has been removed or the battery has run out, the camera power supply control part 118 performs processing for emergency shutdown of camera control. At this time, the system control part 130 shuts down power supply to the lens unit 200.

An AF control part 131 is installed within the system control part 130, and administers AF processing of the digital camera 100. In AF processing, the AF control part 131 calculates the focusing lens drive amount, in accordance with the AF mode, based on lens information such as focus position (position obtainment) and focal length (focal length obtainment) that are obtained from the lens unit 200 via the I/F 120 and AF evaluation values that are input. The focusing lens drive amount is input to the lens unit 200 via a lens communication control part 133 and the I/F 120. For example, in the case of a phase difference AF mode, the AF control part 131 causes the optical image of the object to be incident on a focusing state determination part which is not illustrated via the mirror 112 and a submirror for use in ranging which is not illustrated, and calculates the focusing lens drive amount from phase difference AF evaluation values or the like that are thus obtained. In the case of a contrast AF mode, the AF control part 131 calculates the focusing lens drive amount from contrast AF evaluation values that are calculated with the image processing part 140. In the case of an image capturing plane phase difference AF mode, the AF control part 131 calculates the focusing lens drive amount from image capturing plane phase difference AF evaluation values output from pixels for use in AF embedded in the image sensor 102. Also, the AF control part 131 switches the AF frame position for calculating AF evaluation values, in accordance with AF modes such as a one-point AF mode, a multi-point AF mode, and a face detection AF mode.

An AE control part 132 is installed within the system control part 130, and administers AE processing of the digital camera 100. In AE processing, the AE control part 132 calculates AE control amounts (diaphragm control amount, shutter control amount, exposure sensitivity, etc.) from lens information such as maximum aperture and focal length that is obtained from the lens unit 200 via the I/F 120, AE evaluation values that are input and the like, in accordance with the AE mode. The diaphragm control amount is input to the lens unit 200 via the lens communication control part 133 and the I/F 120. The shutter control amount is input to the shutter control part 110, and exposure sensitivity is input to the image sensor 102. For example, in the case of a finder photography mode, the AE control amount is calculated from AE evaluation values that are obtained by causing the optical image of the object to be incident on a brightness determination part which is not illustrated via the mirror 112 and the mirror 113. In the case of a live view photography mode, the AE control part 132 calculates the AE control amount from AE evaluation values that are calculated with the image processing part 140. Also, the AE control part 132 switches the AE frame position and the weighting amount that are for calculating evaluation values, in accordance with the light metering mode, which includes an evaluation light metering mode, an average light metering mode and a face detection light metering mode.

A panning assist control part 134 is installed within the system control part 130, and administers panning assist processing of the digital camera 100. The panning assist function is only executable in the case of the live view photography mode and where the lens unit 200 that is mounted supports panning assist. If the panning assist function is not executable, the panning assist control part 134 notifies the shutter control amount to the AE control part 132 such that the swing angle of the object during exposure will be a desired value, based on angular velocity information of the camera that is obtained from an angular velocity detection part 208 installed in the lens unit 200, and the like. Also, only the flow amount of the image is controlled. In the case where the panning assist function is executable, the panning assist control part 134 instructs the lens unit 200 via the I/F 120 to execute panning assist processing, in accordance with the panning assist mode. Also, the panning assist control part 134 calculates object angular velocity information including object angular velocity and object angular acceleration, from lens information such as focal length and angular velocity information of the camera that is obtained from the angular velocity detection part 208 of the lens unit 200 via the I/F 120, the motion vector amount that is input from the image processing part 140, and the like. Furthermore, the panning assist control part 134 calculates the setting value of an angular velocity detection period, from frame rate, shutter speed and the like, such that the angular velocity detection period (angular velocity obtainment timing) for detecting the angular velocity at which the digital camera 100 is swung in time with the movement of the object in a panning shot coincides with a motion vector detection period (motion vector detection timing). The angular velocity information of the object and the setting value of the angular velocity detection period are output to the lens unit 200 via the lens communication control part 133 and the I/F 120. At this time, the setting value of the angular velocity detection period includes angular velocity ID information. The angular velocity ID information is added in order for the panning assist control part 134 to determine the period in which the angular velocity of the camera that is received from the lens unit 200 was obtained. Thus, the angular velocity information of the camera also includes angular velocity ID information, and the lens unit 200 transmits the angular velocity ID information that was conveyed with the setting value of the angular velocity detection period to the digital camera 100 in association with the angular velocity information of the camera.

The lens communication control part 133 is installed within the system control part 130, and administers communication processing between the digital camera 100 and the lens unit 200. Upon detecting that the lens unit 200 has been mounted via the I/F 120, the digital camera 100 and the lens unit 200 start communication, and the lens communication control part 133 performs reception of lens information and transmission of camera information, drive commands and the like as appropriate. For example, in the case of the live view photography mode and where the lens unit 200 that is mounted supports panning assist, the lens communication control part 133 implements synchronous signal communication. Synchronous signal communication is communication for notifying, when an image capture synchronous signal is input to the system control part 130 from the timing generation part 104, a communication delay time from the image capture synchronous signal until communication is started. Furthermore, when exposure instructed by the shutter switch 116 (SW2) ends, the system control part 130 receives information on the result of panning assist from the lens unit 200. Also, when the image capture synchronous signal is input from the timing generation part 104 in the case of the live view photography mode, the system control part 130 collectively receives lens information (focusing lens position, focusing lens state, diaphragm state, focal length, etc.).

The I/F 120 is an interface for the digital camera 100 and the lens unit 200 to communicate. Lens information, control commands and the like are transmitted and received, by implementing communication using electrical signals between the system control part 130 within the camera and a lens control part 210, via a connector 20.

Next, the configuration of the lens unit 200 will be described. The focusing lens 201 moves in the optical axis direction to change the focus of the image capture optical system. A focus control part 205 is controlled by the lens control part 210, and drives the focusing lens 201. Also, focus information such as focusing lens position is output to the lens control part 210.

The zoom lens 202 moves in the optical axis direction to change the focal length of the image capture optical system. A zoom control part 206 is controlled by the lens control part 210, and drives the zoom lens 202. Also, zoom information such as focal length is output to the lens control part 210. The diaphragm 203 has a variable opening diameter (aperture value), and changes the amount of light that is incident on the image sensor 102 as a result of the opening diameter being controlled. A diaphragm control part 207 is controlled by the lens control part 210, and drives the diaphragm 203. Also, aperture information such as aperture value is output to the lens control part 210.

The shift lens (image stabilization lens) 204 reduces image blur caused by movement of the camera such as camera shake, by moving in a direction orthogonal to the optical axis. The image stabilization control part 209 is controlled by the lens control part 210, and drives the shift lens 204. Also, image stabilization information such as the range over which image stabilization can be implemented is output to the lens control part 210. The angular velocity detection part 208 detects the angular velocity (yaw direction, pitch direction) of the camera, and outputs the angular velocity to the lens control part 210. The angular velocity detection part 208 is controlled by the lens control part 210.

A lens operation part 211 is composed of a focusing ring, a zoom ring, an AF/MF (autofocus/manual focus) switch, an IS (image stabilization) ON/OFF switch, and the like, and outputs instructions received as a result of user operations to the lens control part 210. In accordance with user operations on the lens operation part 211, the lens control part 210 executes switching of the operation mode regarding the various types of functions installed in the lens unit 200.

The lens control part 210 controls the entire lens by controlling the focus control part 205, the zoom control part 206, the diaphragm control part 207, the image stabilization control part 209, the angular velocity detection part 208 and the like, in accordance with input from the lens operation part 211 and an I/F 220. Also, information input from the various control parts, detection parts and the like is transmitted to the digital camera 100 via the I/F 220, in accordance with the lens information obtainment command received from the digital camera 100 with the I/F 220.

The I/F 220 is an interface for the digital camera 100 and the lens unit 200 to communicate, and the system control part 130 within the camera implements, via the connector 20, communication using electrical signals via the lens communication control part 133. Lens information, control commands, and the like are thereby transmitted and received between the digital camera 100 and the lens unit 200.

Figure 2:
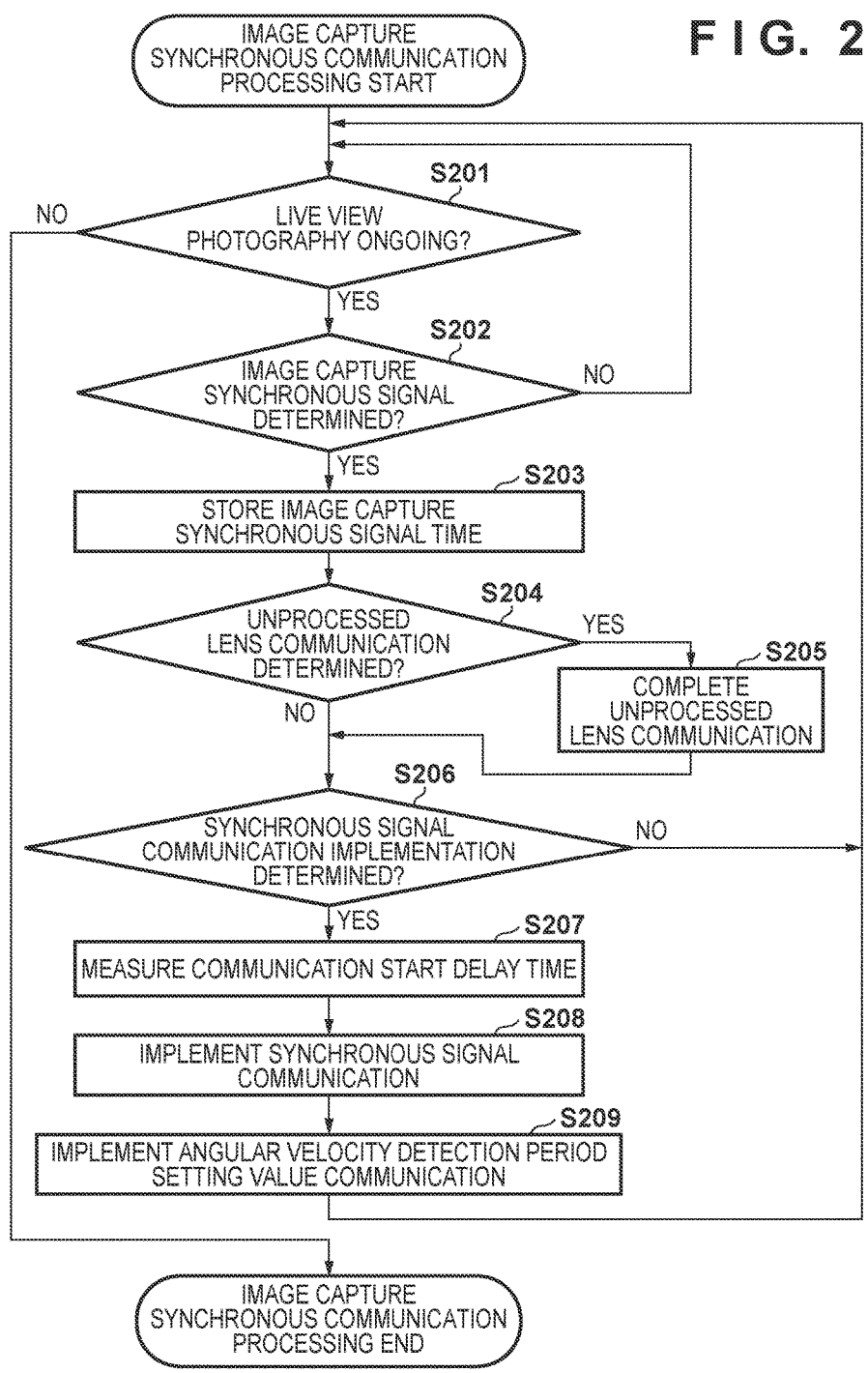
FIG. 2 is a flowchart showing image capture synchronous communication processing in the first embodiment.

Next, FIG. 2 is a flowchart showing operations of synchronous signal communication processing of the digital camera 100, in the case of the live view photography mode and where the lens unit 200 that is mounted supports panning assist, in the present embodiment. The synchronous signal communication processing is started when in the live view photography mode, and is processing for performing communication for the system control part 130 (lens communication control part 133) to notify the timing of the image capture synchronous signal to the lens unit 200.

In step S201, the system control part 130 determines whether live view photography is ongoing. If live view photography is ongoing, the processing proceeds to step S202, and if this is not the case, the synchronous signal communication processing is ended. In step S202, the system control part 130 determines whether the image capture synchronous signal has been input. If the image capture synchronous signal has been input, the processing proceeds to step S203, and if this is not the case, the processing returns to step S201. In step S203, the system control part 130 stores the time at which the image capture synchronous signal was input as the synchronous signal time, and the processing proceeds to step S204.

In step S204, the system control part 130 determines whether unprocessed lens communication remains. This unprocessed lens communication is, for example, communication for notifying the lens drive amount for AF (autofocus) to the lens unit 200. If unprocessed lens communication remains, the processing proceeds to step S205, and if unprocessed lens communication does not remain, the processing proceeds to step S206. In step S205, the system control part 130 completes the unprocessed lens communication, and the processing proceeds to step S206.

In step S206, the system control part 130 determines whether to implement synchronous signal communication. In the case where the lens unit 200 supports panning assist and the panning assist mode is enabled, the system control part 130 determines to implement synchronous signal communication and the processing proceeds to step S207, and if this is not the case, the processing returns to step S201.

In step S207, the system control part 130 stores the elapsed time from input of the above synchronous signal time as a communication delay time (delay time measurement), and the processing proceeds to step S208. In step S208, the system control part 130 implements synchronous signal communication to the lens unit 200 via the I/F 120, and the processing proceeds to step S209. In the synchronous signal communication, the communication delay time is included as transmission data.

In step S209, the system control part 130 implements communication of the setting value of the angular velocity detection period to the lens unit 200 via the I/F 120, and the processing returns to step S201. In the communication of the setting value of the angular velocity detection period, the setting value of the angular velocity detection period input from the panning assist control part 134 is transmitted as transmission data.

As a result of implementing the above processing, the image capture synchronous signal can be notified to the lens unit 200 from the digital camera 100, and the angular velocity detection period for detecting the angular velocity at which the digital camera 100 is swung can be set.

Figure 3:
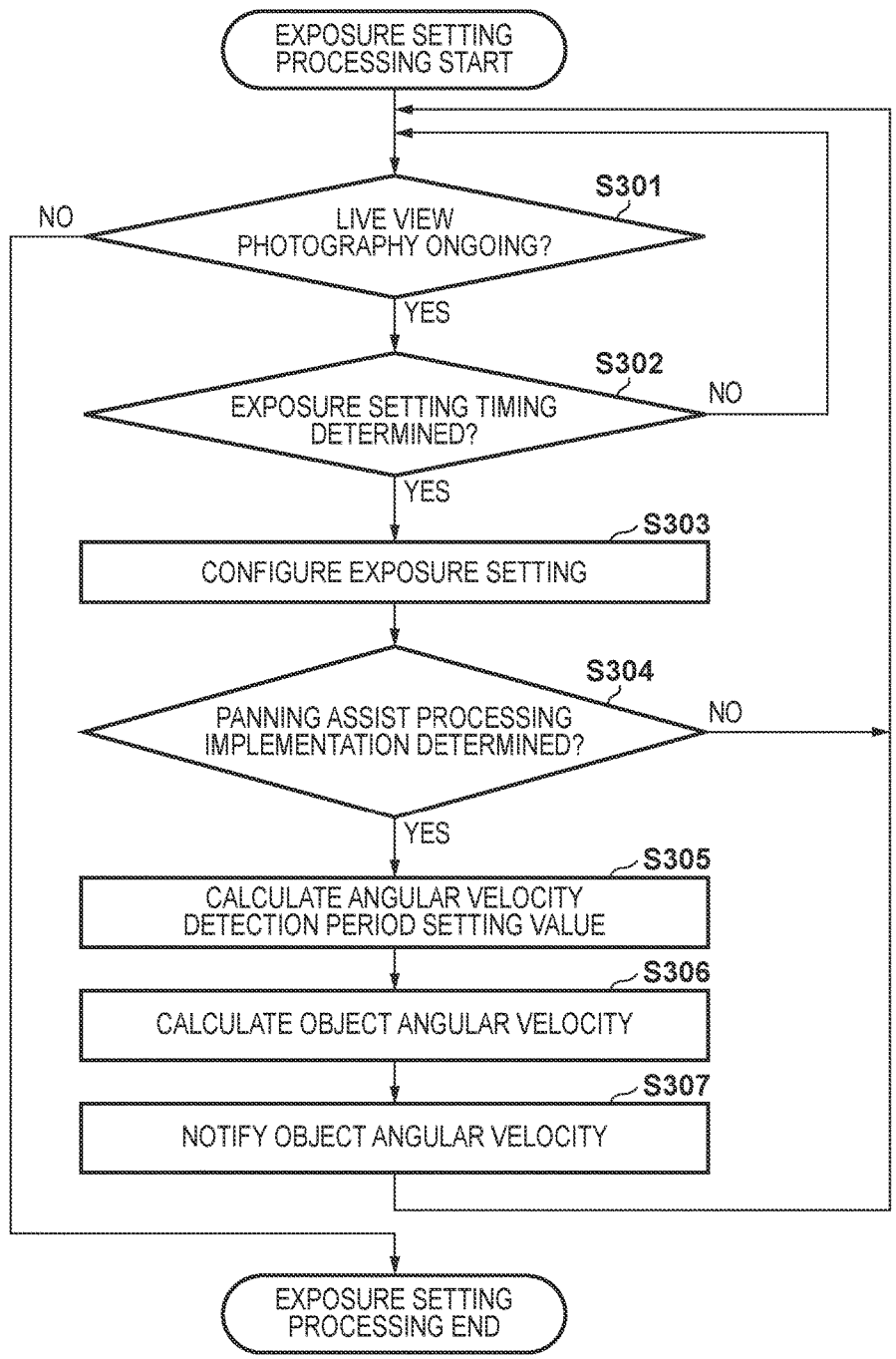
FIG. 3 is a flowchart showing operations of exposure setting processing in the first embodiment.

Next, FIG. 3 is a flowchart showing operations of exposure setting processing of the digital camera 100, in the case of the live view photography mode and where the lens unit 200 that is mounted supports panning assist, in the present embodiment. The exposure setting processing is started when in the live view photography mode, and is processing for controlling the exposure of the next frame.

In step S301, the system control part 130 determines whether live view photography is ongoing. If live view photography is ongoing, the processing proceeds to step S302, and if this is not the case, the exposure setting processing is ended. In step S302, the system control part 130 determines whether the exposure setting timing of the image sensor for the next frame has arrived. If the exposure setting timing has arrived, the processing proceeds to step S303, and if this is not the case, the processing returns to step S301.

In step S303, the system control part 130 performs exposure control of the next frame by calculating an exposure setting value based on the AE control amount, the camera mode and the like, and inputting the exposure setting value to the memory control part 105, and the processing proceeds to step S304.

In step S304, the panning assist control part 134 determines whether to implement panning assist processing. In the case where the lens unit 200 supports panning assist and the panning assist mode is enabled, the panning assist control part 134 determines to implement panning assist processing, and the processing proceeds to step S305, and in the case of not implementing panning assist processing, the processing returns to step S301.

In step S305, the panning assist control part 134 calculates the setting value of the angular velocity detection period as a relative time period from input of the image capture synchronous signal, such that the motion vector detection period and the angular velocity detection period coincide, based on the exposure setting of the next frame or the like, and the processing proceeds to step S306. The calculated setting value of the angular velocity detection period is transmitted to the lens unit 200 in step S209 of FIG. 2. At this time, the setting value of the angular velocity detection period includes angular velocity ID information. The angular velocity ID information is added in order for the panning assist control part 134 to determine the period in which the angular velocity that is received from the lens unit 200 was obtained. Therefore, angular velocity ID information is included, and the lens control part 210 transmits the angular velocity ID information conveyed with the setting value of the angular velocity detection period to the digital camera 100 in association with the angular velocity information.

In step S306, the panning assist control part 134 calculates angular velocity information of the object including object angular velocity and object angular acceleration, based on lens information such as focal length and angular velocity information that is received from the lens unit 200, the motion vector amount that is input from the image processing part 140, and the like. After the panning assist control part 134 inputs the calculated angular velocity information to the lens communication control part 133, the processing proceeds to step S307. At this time, in the present embodiment, the obtainment time of the angular velocity information that is included in the angular velocity information used in computation is included in the angular velocity information of the object.

In step S307, the lens communication control part 133 implements object angular velocity communication, in order to transmit the angular velocity information of the object to the lens unit 200, and the processing returns to step S301. At this time, in the present embodiment, the angular velocity information of the camera is included in data that is received from the lens unit 200 in the object angular velocity communication.

Exposure control of the next frame is performed by implementing the above processing. Also, the angular velocity detection period that is notified to the lens unit 200 with the next image capture synchronous signal can be set, and the angular velocity of the object can be notified to the lens unit 200. Also, the angular velocity information of the camera can be obtained from the lens unit 200.

Figure 4:
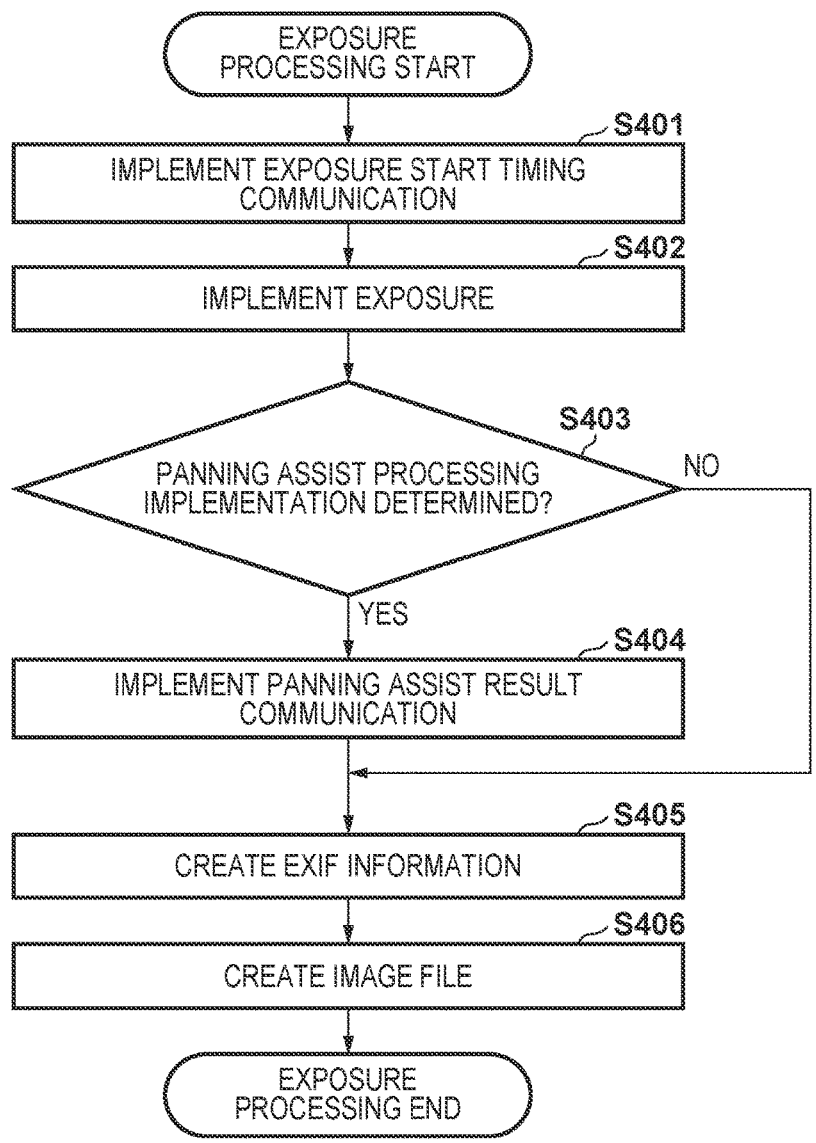
FIG. 4 is a flowchart showing operations of exposure processing in the first embodiment.

Next, FIG. 4 is a flowchart showing operations of live view exposure processing of the digital camera 100, in the case of the live view photography mode and where the lens unit 200 that is mounted supports panning assist, in the present embodiment. The live view exposure processing is started by an exposure start instruction from the shutter switch 116 (SW2) when in the live view photography mode.

In S401, the lens communication control part 133 implements communication for notifying the lens unit 200 that the exposure start timing has arrived, and the processing proceeds to step S402. In step S402, the system control part 130 implements exposure processing in order to obtain image data, and the processing proceeds to step S403. The image data is recorded to the memory 107 via the image processing part 140 and the memory control part 105. Note that, in the exposure processing of step S402, panning assist is performed automatically, in the case where the lens unit 200 supports panning assist and the panning assist mode is enabled.

In step S403, the lens communication control part 133 determines whether panning assist processing has been implemented in step S402. In the case where the lens unit 200 supports panning assist and the panning assist mode is enabled, the lens communication control part 133 determines that panning assist processing has been implemented and the processing proceeds to step S405, and if it is determined that panning assist processing has not been implemented, the processing proceeds to step S404. In step S404, the lens communication control part 133 implements communication for receiving panning assist result information from the lens unit 200, and the processing proceeds to step S405.

In step S405, the system control part 130 creates EXIF information that is embedded in the image file, and the processing proceeds to step S406. The EXIF information is recorded to the memory 107 via the memory control part 105. In the present embodiment, the EXIF information includes a panning assist result, together with lens information, camera mode and the like. This panning assist result is information such as the object angular velocity and whether or not the shift lens 204 has reached the movement boundary.

In step S406, the system control part 130 controls the image processing part 140 to create an image file from the image data and the EXIF information, and record the created image file to the recording part 108 via the memory control part 105. By implementing the above processing, the digital camera 100 is able to obtain the result of panning assist implemented at the time of exposure from the lens unit 200, and to record the panning assist result in the obtained image data.

Next, FIG. 5 is a flowchart showing reception operations of synchronous signal communication in the lens unit 200, in the case of the live view photography mode and where the lens unit 200 that is mounted supports panning assist, in the present embodiment. The operations from step S501 are started when the lens unit 200 receives synchronous signal communication from the digital camera 100.

In step S501, the lens control part 210 stores the time at which communication was implemented by storing the current time of a free-run timer that is used for time management within the lens unit 200, and the processing proceeds to step S502. In step S502, the lens control part 210 determines whether communication of the synchronous signal of a predetermined communication data length has been communicated. If communication is not completed, step S502 is repeated, and when communication is completed, the processing proceeds to step S503.

In step S503, the lens control part 210 subtracts the communication delay time that is included in the data received in communication of the synchronous signal from the time at which communication was implemented, which was stored in step S501. Here, the communication delay time is, as already described, a delay time from the generation timing of the image capture synchronous signal by the timing generation part 104 in the digital camera 100 until the digital camera 100 starts communication. As a result of the above operation of subtracting the communication delay time, a timing of the image capture synchronous signal within the lens (predicted value of the timing of the image capture synchronous signal within the digital camera 100) that coincides with the timing of the image capture synchronous signal within the digital camera 100 can be calculated.

Next, FIG. 6 is a flowchart showing reception operations of angular velocity detection period setting communication in the lens unit 200, in the case of the live view photography mode and where the lens unit 200 that supports panning assist, in the present embodiment. The operations from step S601 are started when the lens unit 200 receives communication for setting the angular velocity detection period from the digital camera 100.

In step S601, the lens control part 210 determines whether communication for setting the angular velocity detection period of the camera of a predetermined communication data length has been communicated. If communication has not been completed, step S601 is repeated, and when communication is completed, the processing proceeds to step S602.

In step S602, the lens control part 210 sets (determines) the angular velocity detection period that is included in the data received in the communication for setting the angular velocity detection period of the camera, and is the period in which the angular velocity of the camera is detected with reference to the timing of the image capture synchronous signal within the lens calculated at the aforementioned step S503. The lens control part 210 obtains the angular velocity in the above angular velocity detection period from the angular velocity detection part 208, and stores angular velocity information with the angular velocity ID information included in communication for setting the angular velocity detection period and the obtainment time of the angular velocity information added thereto. As a result of implementing the above processing, an angular velocity detection period that coincides with the motion vector detection period in the digital camera 100 can be set in the lens unit 200.

Next, FIG. 7 is a flowchart showing reception operations of object angular velocity communication in the lens unit 200, in the case of the live view photography mode and where the lens unit 200 that is mounted supports panning assist, in the present embodiment. The operations from step S701 are started when the lens unit 200 receives communication of the angular velocity of the object from the digital camera 100.

In step S701, the lens control part 210, in order to transmit the angular velocity information of the camera stored in the aforementioned step S602 to the digital camera 100, readies the angular velocity information in a transmission buffer, and the processing proceeds to step S702. In step S702, the lens control part 210 determines whether communication of the angular velocity of the object of a predetermined communication data length has been communicated. If communication has not been completed, step S702 is repeated, and when communication is completed, the processing proceeds to step S703. In step S703, the lens control part 210 stores the angular velocity information of the object in preparation for the exposure start timing. As a result of implementing the above processing, the lens unit 200 is able to obtain the angular velocity information of the object from the digital camera 100.

Figure 8:
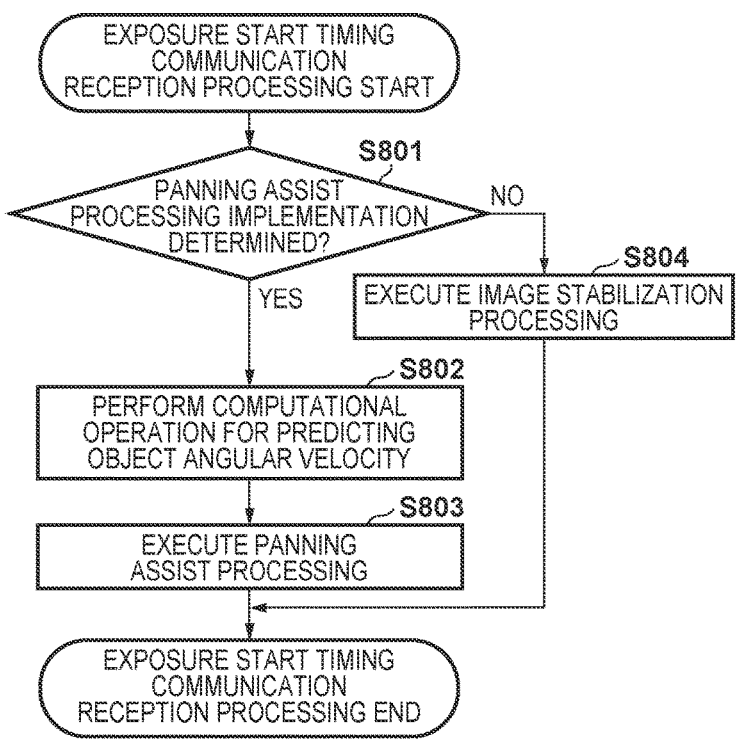
FIG. 8 is a flowchart showing reception processing of exposure start timing communication in the first embodiment.

Next, FIG. 8 is a flowchart showing reception operations of exposure start timing communication in the lens unit 200, in the case of the live view photography mode and where the lens unit 200 that is mounted supports panning assist, in the present embodiment. The operations from step S801 are started when the lens unit 200 receives communication of the exposure start timing from the digital camera 100.

In step S801, the lens control part 210 determines whether to perform exposure for implementing panning assist processing. If performing exposure for implementing panning assist processing, the processing proceeds to step S802, and if this is not the case, the processing proceeds to step S804. In step S802, the lens control part 210 performs a computational operation for predicting the angular velocity of the object at the current time, from the angular velocity information of the object stored in the aforementioned step S703 and the current time, and the processing proceeds to step S803. For example, in the case where the angular velocity of the object at the current time is given as V, the current time is given as T, the angular velocity of the object that is included in the angular velocity information of the object is given as v, the angular acceleration of the object is given as a, and the obtainment time of the angular velocity information of the camera is given as t, the lens control part 210 performs the prediction operation using equation (1) (object angular velocity calculation).

$$V = v + a \times (T - t) \quad (1)$$

Note that prediction operation is not limited thereto equation.

In step S803, the lens control part 210 controls the image stabilization control part 209 using the object angular velocity at the current time, and executes panning assist processing. For example, in the case where the correction amount resulting from panning assist is given as G, and the angular velocity of the camera obtained from the angular velocity detection part 208 is given as g, the panning assist correction amount is calculated using equation (2).

$$G = g - V \quad (2)$$

Note that the method of computing the correction amount G resulting from panning assist is not limited thereto equation. By driving the shift lens 204 by the correction amount resulting from panning assist, it becomes possible to stop the movement of the object. In step S804, the lens control part 210, rather than performing panning assist, executes a normal image stabilization operation, by performing image stabilization processing using only the angular velocity of the camera obtained from the angular velocity detection part 208. As a result of implementing the above processing, the lens unit 200 is able to execute panning assist at the time of exposure.

Figure 9:
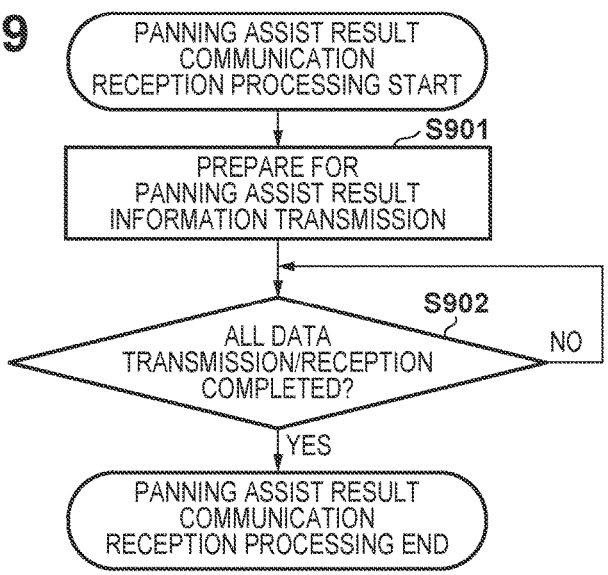
FIG. 9 is a flowchart showing reception processing of panning assist result communication in the first embodiment.

Next, FIG. 9 is a flowchart showing operations for communicating the result of panning assist, in the case of the live view photography mode and where the lens unit 200 that is mounted supports panning assist, in the present embodiment. The operations from step S901 are started when the lens unit 200 receives communication of the result of panning assist from the digital camera 100.

In step S901, the lens control part 210, in order to transmit the object angular velocity predicted at the aforementioned step S802 and the like to the digital camera 100 as the result of panning assist, readies the object angular velocity in a transmission buffer, and the processing proceeds to step S902.

In step S902, the lens control part 210 determines whether communication of the result of panning assist of a predetermined communication data length has been communicated. If communication has not been completed, step S902 is repeated, and when communication is completed, the processing is completed.

As a result of implementing the above processing, the lens unit 200 is able to obtain an object angular velocity that takes account of the time that has elapsed from the angular velocity detection time until the exposure start, and perform more highly accurate panning assist.

Figure 10:
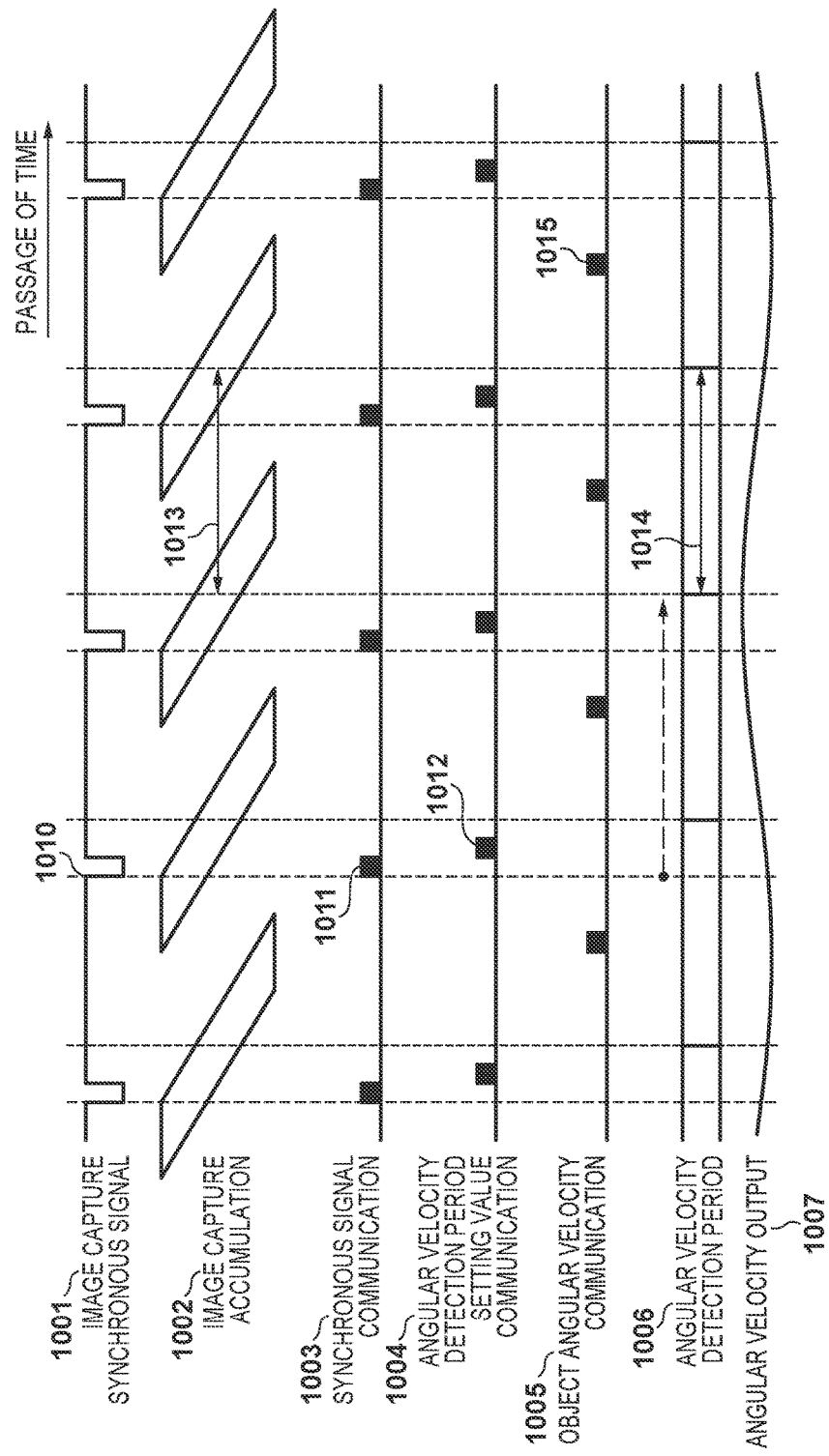
FIG. 10 is a timing chart illustrating processing timing of a camera system in the first embodiment.

Next, FIG. 10 is a diagram showing the timing of respective processing during the panning assist mode, in the case of the live view photography mode and where the lens unit 200 that is mounted supports panning assist, in the present embodiment.

An image capture synchronous signal 1001 is a synchronous signal that is output by the timing generation part 104. Image capture accumulation 1002 is the accumulation period of the image sensor 102, and accumulation and readout of electric charges in order from the upper part of the screen is started on receipt of the image capture synchronous signal 1001. Synchronous signal communication 1003 is the timing of synchronous signal communication that is implemented at step S208 in the synchronous communication processing shown in FIG. 2.

Communication 1004 of the setting value of the detection period of the angular velocity of the camera is the timing of the communication of the setting value of the detection period of the angular velocity that is implemented at step S209 in the synchronous communication processing of FIG. 2. Communication 1005 of the angular velocity of the object is the timing of the communication of the angular velocity of the object implemented at step S307 in the exposure setting processing of FIG. 3.

An angular velocity detection period 1006 is the angular velocity detection period that is set at step S602 in the processing for communicating the setting value of the detection period of the angular velocity of FIG. 6. When communication of the setting value of the angular velocity detection period ends, the angular velocity of the camera corresponding to that period is calculated, and the angular velocity information of the camera is stored with the angular velocity ID information that is included in the setting value communication of the angular velocity detection period and the obtainment time of angular velocity information added thereto.

Angular velocity output 1007 is the output from the angular velocity detection part 208, and the lens control part 210 samples this angular velocity output during the angular velocity detection period 1006. For example, synchronous signal communication 1011 is implemented on receipt of an image capture synchronous signal 1010, and the lens control part 210 computes an in-lens image capture synchronous signal timing that coincides with the image capture synchronous signal 1010. Thereinafter, due to communication 1012 of the setting value of the angular velocity detection period being implemented, the detection period setting value of the angular velocity calculated so as to coincide with a motion vector detection period 1013 in the exposure setting processing of the immediately previous image capture synchronous signal is transmitted to the lens unit 200. The lens control part 210 is thereby able to set a detection period 1014 of the angular velocity so as to coincide with the motion vector detection period 1013. Angular velocity information of the camera obtained due to the detection period 1014 of the angular velocity elapsing is notified to the digital camera 100 by communication 1015 of the angular velocity of the object. The panning assist control part 134 calculates the angular velocity information of the object from the angular velocity information on the camera at that time and the motion vector information that is obtained in the motion vector detection period 1013. By repeating the above processing, it becomes possible to continuously transmit correct angular velocity information of the object to the lens unit 200.

As described above, according to the present embodiment, the timings of motion vector detection and detection of the angular velocity of the camera can be made to coincide, by implementing synchronous signal communication for notifying a communication start delay time to the interchangeable lens from the camera main body. This enables the detection accuracy of the moving speed of the object to be raised, and the accuracy of the panning assist function to be improved.

Second Embodiment

While an image capturing apparatus of a second embodiment of the present invention has the same configuration as the first embodiment shown in FIG. 1, the second embodiment realizes an improvement in the performance of AF control and AE control. The AF control part 131 in FIG. 1 is able to calculate a more highly accurate focusing lens drive amount, by being able to correctly grasp the temporal relationship between the AF evaluation value and lens information such as the focusing lens position, when implementing contrast AF or image capturing plane phase difference AF. Furthermore, the AE control part 132 is also able to calculate a more highly accurate AE control amount, by correctly grasping the temporal relationship between the AE evaluation value and lens information such as the maximum aperture and the focal length. Accordingly, if the digital camera 100 is able to correctly determine the time at which the lens unit 200 obtains lens information, improvement in the performance of AF control and AE control becomes possible. Thereby, in the second embodiment, a plurality of communications are collectively transmitted, triggered by the image capture synchronous signal. Hereinafter, the second embodiment will be described more specifically.

Figure 11:
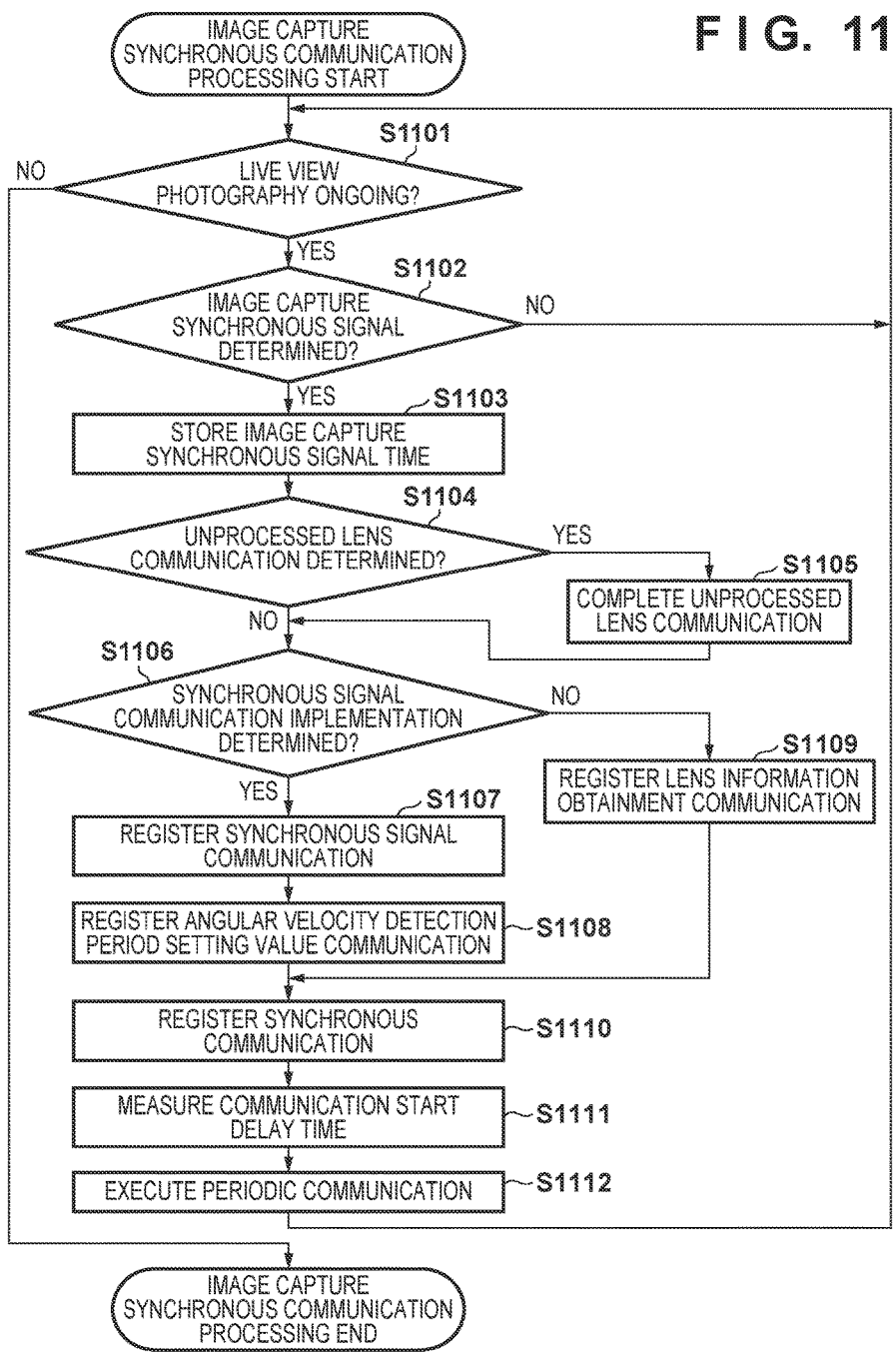
FIG. 11 is a flowchart showing image capture synchronous communication processing in a second embodiment.

FIG. 11 is a flowchart showing operations of synchronous signal communication of the digital camera 100, in the case of the second live view photography mode and where the lens unit 200 that is mounted supports panning assist, in the present embodiment. The synchronous signal communication processing is started when in the live view photography mode, and is processing for performing communication for the system control part 130 to notify the timing of an image capture synchronous signal to the lens unit 200.

In step S1101, the system control part 130 determines whether live view photography is ongoing. If live view photography is ongoing, the processing proceeds to step S1102, and if this is not the case, the synchronous communication processing is ended. In step S1102, the system control part 130 determines whether the image capture synchronous signal has been input. If the image capture synchronous signal has been input, the processing proceeds to step S1103, and if this is not the case, the processing returns to step S1101. In step S1103, the system control part 130 stores the time at which the image capture synchronous signal was input as the image capture synchronous signal timing, and the processing proceeds to step S1104.

In step S1104, the system control part 130 determines whether unprocessed lens communication remains. This unprocessed lens communication is, for example, communication for notifying the lens drive amount for AF (autofocus) to the lens unit 200. If unprocessed lens communication remains, the processing proceeds to step S1105, and if unprocessed lens communication does not remain, the processing proceeds to step S1106. In step S1105, the system control part 130 completes the unprocessed lens communication, and the processing proceeds to step S1106.

In step S1106, the system control part 130 determines whether to implement synchronous signal communication. In the case where the lens unit 200 supports panning assist and the panning assist mode is enabled, the system control part 130 determines to implement synchronous signal communication and the processing proceeds to step S1107, and if this is not the case, the processing returns to step S1110.

In step S1107, the system control part 130 registers the synchronous signal communication as communication to be implemented with periodic communication which will be discussed later, and the processing proceeds to step S1108. At this time, in the present embodiment, the focusing lens position is included as data received in synchronous signal communication. Note that the received data that is included is not limited thereto. In step S1108, the system control part 130 registers the communication of the setting value of the angular velocity detection period as communication to be implemented with periodic communication which will be discussed later, and the processing proceeds to step S1110. In the setting value communication of the angular velocity detection period, the system control part 130 transits the setting value of the angular velocity detection period input from the panning assist control part 134, as transmission data.

In step S1109, the system control part 130 registers the communication for obtaining the focusing lens position as communication to be implemented with periodic communication which will be discussed later, and the processing proceeds to step S1110. Note that the communication that is registered here is not limited thereto. In step S1110, the system control part 130 registers the communication for obtaining the remaining lens information as communication to be implemented with periodic communication which will be discussed later, and the processing proceeds to step S1111. The registration period is changed, according to the obtainment frequency that is required for each type of lens information.

In step S1111, the lens control part 210 stores the time that has elapsed from the image capture synchronous signal timing until the actual communication as a communication delay time, and the processing proceeds to step S1112. In step S1112, the system control part 130 executes the periodic communication (periodic communication determination) registered beforehand with the lens units 200 via the I/F 120, and the processing proceeds to step S1101. Note that in the case where synchronous signal communication is registered, the delay time of the synchronous signal is included as transmission data of the synchronous signal communication.

As a result of the above processing, the image capture synchronous signal can be notified to the lens unit 200 from the digital camera 100, the angular velocity detection period can be set, and lens information of the timing at which the image capture synchronous signal is synchronized can be further obtained.

Next, FIG. 12 is a flowchart showing reception operations of synchronous signal communication in the lens unit 200, in the case of the live view photography mode and where the lens unit 200 that is mounted supports panning assist, in the present embodiment. The operations from step S1201 are started when the lens unit 200 first receives synchronous signal communication from the digital camera 100.

In step S1201, the lens control part 210 stores the time at which communication was implemented, by storing the current time of a free-running timer that is used in time period management within the lens unit 200, and the processing proceeds to step S1202. In step S1202, the lens control part 210, in order to transmit lens information to the digital camera 100, stores the lens information within a transmission buffer, and the processing proceeds to step S1203. At this time, in the present embodiment, the focusing lens position is included, as transmission data of the synchronous signal communication.

In step S1203, the lens control part 210 determines whether synchronous signal communication of a predetermined communication data length has been communicated. If communication has not been completed, step S1203 is repeated, and when communication is completed, the processing proceeds to step S1204.

In step S1204, the lens control part 210 calculates an in-lens image capture synchronous signal timing that coincides with the image capture synchronous signal timing within the digital camera 100, by subtracting, from the time, stored in step S1201, at which communication was implemented, the delay time from the synchronous signal that is included in the data received in the synchronous signal communication.

As a result of implementing the above processing, the lens unit 200 is able to determine the in-lens image capture synchronous signal timing that coincides with the timing of the image capture synchronous signal in the digital camera 100. Also, lens information of the timing synchronized with an image capture synchronous signal can be transmitted.

As described above, according to the second embodiment, the timings of motion vector detection and detection of the angular velocity of the camera can be made to coincide, by implementing synchronous signal communication for notifying a communication start delay time to an interchangeable lens from the camera main body. Furthermore, the AF evaluation value, the AE evaluation value and the output time period of lens information can be correctly determined. This enables the detection accuracy of the moving speed of the object to be raised, and the accuracy of the panning assist function to be improved. At the same time, the accuracy of AF control and AE control can be improved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing part (CPU), micro processing part (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-059153, filed Mar. 23, 2016, which is hereby incorporated by reference herein in its entirety.

What is claimed is:

1. A lens apparatus capable of being attached to an image capturing apparatus, comprising:
   at least one processor or circuit configured to operate as:
      an obtaining unit configured to obtain lens information;
      a communication unit configured to receive first information corresponding to generation of a synchronous signal of the image capturing apparatus and second information corresponding to time, and to transmit the lens information to the image capturing apparatus;
      a acquiring unit configured to acquire third information corresponding to a timing at which the communication unit receives the first information; and
      a determination unit configured to determine, based on the second information and the third information, fourth information corresponding to timing for the obtaining unit to obtain the lens information.

2. The lens apparatus according to claim 1, wherein second information corresponds to the time from a timing at which the synchronous signal is generated to a timing at which the first information is transmitted.

3. The lens apparatus according to claim 1, wherein the communication unit further receives fifth information relating to time for the obtaining unit to obtain the lens information, wherein the determination unit determines the fourth information based on the fifth information.

4. The lens apparatus according to claim 1, wherein at least one processor or circuit is configured to further operate as:
   an angular velocity detection unit configured to obtain first angular velocity information at which a lens moves,
   wherein the lens information is the first angular velocity information.

5. An image capture apparatus capable of attaching a lens apparatus, comprising:
   at least one processor or circuit configured to operate as:
      an image capturing unit configured to obtain a captured image;
      a synchronous signal generation unit configured to generate a synchronous signal for reading out the captured image from the image capturing unit;
      a communication unit configured to transmit first information corresponding to generation of a synchronous signal and second information corresponding to the time from a timing at which the synchronous signal is generated to a timing at which the communication unit transmits the first information to the lens apparatus, and to receive lens information from the lens apparatus.

6. The image capture apparatus according to claim 5, wherein the lens information is an angular velocity, and wherein at least one processor or circuit is configured to further operate as:
   a motion vector detection unit configured to detect a motion vector from the captured image read out from the image capturing unit; and an angular velocity calculation unit configured to calculate an angular velocity at which an object moves, based on the motion vector and the lens information received from the lens apparatus.

7. The image capture apparatus according to claim 6, wherein at least one processor or circuit is configured to further operate as a determination unit configured to determine timing for an angular velocity detection unit to obtain the angular velocity, which is the lens information, such that the timing for obtaining the angular velocity coincides with a timing for detecting the motion vector.

8. A method of controlling a lens apparatus capable of being attached to an image capturing apparatus, comprising:
obtaining lens information;
receiving first information corresponding to generation of a synchronous signal of the image capturing apparatus and second information corresponding to time, and transmitting the lens information to the image capturing apparatus;
acquiring third information corresponding to a timing at which the first information is received in the receiving; and
determining, based on the second information and the third information, fourth information corresponding to timing for the obtaining of the lens information.

9. A method of controlling an image capture apparatus capable of attaching a lens apparatus, comprising:
obtaining a captured image;
generating a synchronous signal for reading out the captured image from an image capturing unit;
transmitting first information corresponding to generation of a synchronous signal and second information corresponding to time from a timing at which the synchronous signal is generated to a timing at which the transmitting of the first information to the lens apparatus, and receiving lens information from the lens apparatus.

10. A lens apparatus capable of being attached to a control apparatus, comprising:
at least one processor or circuit configured to operate as:
an obtaining unit configured to obtain first information corresponding to an angular velocity;
a communication unit configured to perform first communication, second communication and third communication,
wherein the communication unit receives second information in the first communication,
wherein the communication unit receives third information in the second communication, and
wherein the communication unit transmits, in the third communication, the first information based on timing where the second information was received, the second information, and the third information.

11. The lens apparatus according to claim 10, wherein the second information corresponds to time from a timing at which a synchronous signal is generated to a timing at which the first communication is performed.

12. The lens apparatus according to claim 10, wherein the third information relates to timing for the obtaining unit to obtain the first information.

13. The lens apparatus according to claim 10, wherein the communication unit further receives, in the second communication, fourth information corresponding to ID information of the first information, wherein the communication unit further transmits, in the third communication, the fourth information.

14. The lens apparatus according to claim 10, wherein the communication unit further receives, in the third communication, fifth information corresponding to the timing where the first information was obtained.

15. The lens apparatus according to claim 10, wherein at least one processor or circuit is configured to further operate as:
a detection unit configured to detect the first information.

16. The lens apparatus according to claim 13, wherein the first information is first angular velocity information at which a lens moves.

17. The lens apparatus according to claim 14, further comprising:
a shift lens configured to move in a direction orthogonal to an optical axis of the lens apparatus,
wherein the communication unit further receives, in fourth communication, second angular velocity information which corresponds to angular velocity information of the object based on the first angular velocity information, and fifth information corresponding to the timing where the first information has been obtained, from the control apparatus,
wherein the at least one processor or circuit is configured to further operate as an image stabilization unit configured to perform image stabilization by controlling the shift lens based on the second angular velocity information.

18. The lens apparatus according to claim 13, further comprising:
a focusing lens,
wherein the first information is information on a position of the focusing lens.

19. The lens apparatus according to claim 13, further comprising:
a zoom lens,
wherein the first information is information on information on a focal length.

20. The lens apparatus according to claim 15, wherein the detection unit detects the first information at the timing based on the second information and the third information.

21. The lens apparatus according to claim 15, wherein the detection unit detects the first information at a timing based on a timing where the first communication was performed.

22. The lens apparatus according to claim 10, wherein the control apparatus is an image capturing apparatus.

23. The lens apparatus according to claim 10, wherein the first information is angular velocity of yaw direction and angular velocity of pitch direction.

24. A control apparatus capable of attaching a lens apparatus, comprising:
at least one processor or circuit configured to operate as:
a generation unit configured to generate a second information corresponding to a synchronous signal;
a communication unit configured to perform first communication, second communication and third communication,
wherein the communication unit transmits the second information in the first communication,
wherein the communication unit transmits third information in the second communication,
wherein the communication unit receives, in the third communication, first information based on timing where the second information was transmitted, the second information, and the third information.

25. The control apparatus according to claim 24,
wherein the second information corresponds to time from a timing at which the synchronous signal is generated to a timing at which the first communication is performed.

26. The control apparatus according to claim 24,
wherein the third information relates to timing for obtaining the first information.

27. The control apparatus according to claim 24,
wherein the communication unit further transmits, in the second communication, fourth information corresponding to ID information of the first information,
wherein the communication unit further receives, in the third communication, the fourth information.

28. The control apparatus according to claim 24,
wherein the communication unit further transmits, in the third communication, fifth information corresponding to the timing where the first information was obtained.

29. The control apparatus according to claim 27,
wherein the first information is first angular velocity information at which an interchangeable lens moves.

30. The control apparatus according to claim 27,
wherein the first information is information on the position of a focusing lens of the lens apparatus.

31. The control apparatus according to claim 27,
wherein the first information is information on information on a focal length of the lens apparatus.

32. The control apparatus according to claim 24,
wherein the control apparatus is an image capturing apparatus.

33. The control apparatus according to claim 24, further comprising:
a periodic communication determination unit configured to determine, as periodic communication, a plurality of communications to be communicated at a timing of the synchronous signal, and
a first communication unit sets the synchronous signal communication to a beginning of the periodic communication and implements the periodic communication.

34. The control apparatus according to claim 24, wherein the first information is angular velocity of yaw direction and angular velocity of pitch direction.

35. A method of controlling a lens apparatus capable of being attached to a control apparatus, the method comprising:
obtaining first information corresponding to an angular velocity;
performing first communication, second communication and third communication;
wherein in the first communication, second information is received,
wherein in the second communication, third information is received, and
wherein in the third communication, the first information is transmitted based on timing where the second information was received, the second information, and the third information.

36. A method of controlling a control apparatus capable of attaching a lens apparatus, the method comprising:
generating a second information corresponding to a synchronous signal;
performing first communication, second communication and third communication,
wherein in the first communication, the second information is transmitted,
wherein in the second communication, third information is transmitted, and
wherein in the third communication, first information is received based on timing where the second information was transmitted, the second information, and the third information.

37. The lens apparatus according to claim 10,
wherein the first information is obtained at a timing based on timing where the second information was received, the second information, and the third information.

38. The control apparatus according to claim 24,
wherein the first information is obtained at a timing based on timing where the second information was received, the second information, and the third information.

39. The lens apparatus according to claim 10,
wherein the synchronous signal is an image capture synchronous signal generated by the control apparatus.

40. The control apparatus according to claim 24,
wherein the synchronous signal is an image capture synchronous signal generated by the control apparatus.

* * * * *